United States Patent [19]

Thomas

[11] Patent Number: 4,495,444
[45] Date of Patent: Jan. 22, 1985

[54] VEHICLE LIGHTING SYSTEM
[76] Inventor: Francis J. Thomas, Box 45, Candlewood Isle, New Fairfield, Conn. 06810
[21] Appl. No.: 472,577
[22] Filed: Mar. 7, 1983
[51] Int. Cl.³ ............................................. H05B 39/10
[52] U.S. Cl. ....................................... 315/82; 315/83; 315/93; 307/10 LS
[58] Field of Search ............................. 315/82, 83, 93; 307/10 LS

[56] References Cited
U.S. PATENT DOCUMENTS

| | | | |
|---|---|---|---|
| 1,925,200 | 9/1933 | Miller | 315/83 |
| 2,021,677 | 11/1935 | Barrett | 315/83 |
| 2,023,954 | 12/1935 | Hagar et al. | 315/83 |
| 2,540,410 | 2/1951 | Wagner | 315/93 |
| 2,603,673 | 7/1952 | Brake | 307/10 LS |
| 2,910,621 | 10/1959 | Paule | 315/83 |

*Primary Examiner*—Harold Dixon
*Attorney, Agent, or Firm*—John F. Ohlandt

[57] ABSTRACT

A vehicle lighting system of the type employing dim or low-beam headlights and bright or high-beam headlights is provided with continual sensing of the operativeness of a selected headlight to cause the automatic substitution of a non-selected headlight in the event of failure of the selected headlight.

11 Claims, 4 Drawing Figures

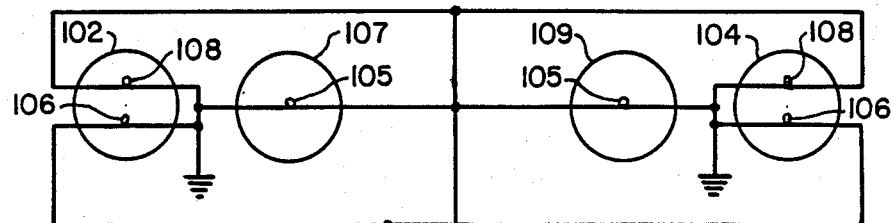
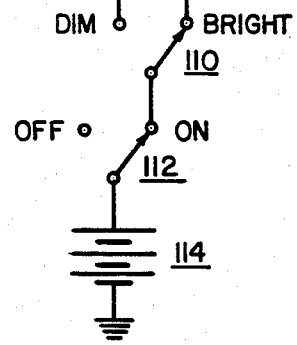
FIG.3
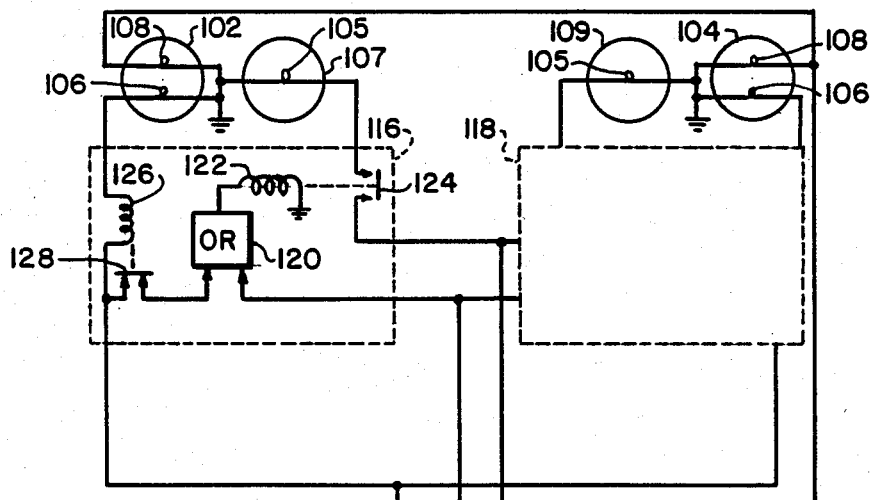
FIG.4
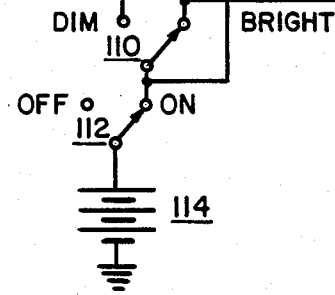

VEHICLE LIGHTING SYSTEM

BACKGROUND OF THE INVENTION

1. Field of the Invention

The present invention relates to a vehicle lighting system and, more particularly, to an automatic control arrangement in such a system for the purpose of reducing hazards in driving.

2. Background Information

A variety of techniques and means for controlling vehicle light beams in order to avoid hazardous driving situations are well known. For example, reference may be made to U.S. Pat. No. 3,079,529 in which an automatically operative means controls a substantial portion of the light emitted by an automobile headlight responsive to light from a source in front of the vehicle.

The present invention has for its principal object the reduction of safety hazards which exist when a vehicle lighting source becomes inoperative.

Another object is to overcome such safety hazards without any action being required on the part of the operator of the vehicle.

BRIEF DESCRIPTION OF THE INVENTION

Automobiles and other road vehicles are generally equipped with dual headlight systems for night driving. Dim or low-beam lighting is directed to the area near the front of the vehicle and is used in urban areas where roads are illuminated by street lights and in rural areas at times when other traffic is present. Bright or high-beam lighting is additionally directed to an area at a distance from the vehicle to permit more distant visibility by the vehicle operator and is generally used when operating on roads that are not illuminated by street lights, particularly for high-speed vehicle operation.

Headlights are ordinarily mounted on both sides of the front of a vehicle so that operators of other vehicles, particularly those approaching from ahead, can judge the width of the vehicle, its relative position and its speed.

When headlights become inoperative, either due to the failure of a light filament, or caused by defective or corroded connections other other reasons, the operator obviously suffers a reduction in visibility. Headlight failure also results in a potentially more serious safety hazard due to the inability of operators of oncoming vehicles to judge the size, position and speed of the vehicle with a defective headlight.

This safety hazard is partially offset in some vehicles by provision of a second illuminated headlight on each side of the vehicle during bright or high-beam operation. However, many vehicles are not provided with this feature and, even in those vehicles that are provided with this feature, the hazard remains during dim or low-beam lighting for which there is ordinarily only a single light on each side of the vehicle.

The present invention is directed toward reducing or eliminating the safety hazards that otherwise exist when a vehicle headlight becomes defective. While there are obvious cumbersome and expensive lighting designs that could be employed to overcome this safety hazard, such as supplying backup or spare headlights which could be activated upon failure of the usual headlights, under the present invention the safety hazard is resolved simply and inexpensively without requiring any backup or spare headlights.

In accordance with the present invention, the operation of a selected headlight is continually monitored and, in the event of failure of the selected headlight, the other (non-selected) headlight is activated. For example, when the operator selects bright or high beam lighting, the operation of the headlight filaments is continuously monitored and in the event of failure of a filament or other defect, the corresponding dim or low beam filament is automatically activated. While the resulting illumination of the road is not totally corrected, the illumination is better than it would be in the absence of this feature. Of greater importance is the improved safety with respect to oncoming traffic: operators of oncoming traffic will still observe illuminated headlights on both sides of the vehicle instead of viewing only a single headlight.

The invention can likewise be employed in the event of defective dim or low beam lighting by causing the automatic substitution of a bright or high beam headlight for the defective dim lighting. This feature is particularly advantageous for vehicles that employ dual bright or high beam lighting because the less-bright of the dual beams is substituted for the defective dim or low beam headlight, thus avoiding much of the undesirable glare that would be caused by using the more-bright or higher beam light as a substitute.

The invention is also applicable to other lighting, such as vehicle tail-lights, stop lights and directional signals, where failure of a selected light automatically causes the substitution of another light.

Other and further objects, advantages and features of the present invention will be understood by reference to the following specification in conjunction with the annexed drawing, wherein like parts have been given like numbers.

BRIEF DESCRIPTION OF THE DRAWING

FIG. 3 is a functional diagram showing a known vehicle lighting system employing two separate headlights on each side of the vehicle, one providing dual beams and the other providing a single beam.

FIG. 4 is a functional diagram showing a modification to the vehicle lighting system of FIG. 3, the modified system constituting another embodiment of the present invention.

DETAILED DESCRIPTION OF THE INVENTION

Figure 1:
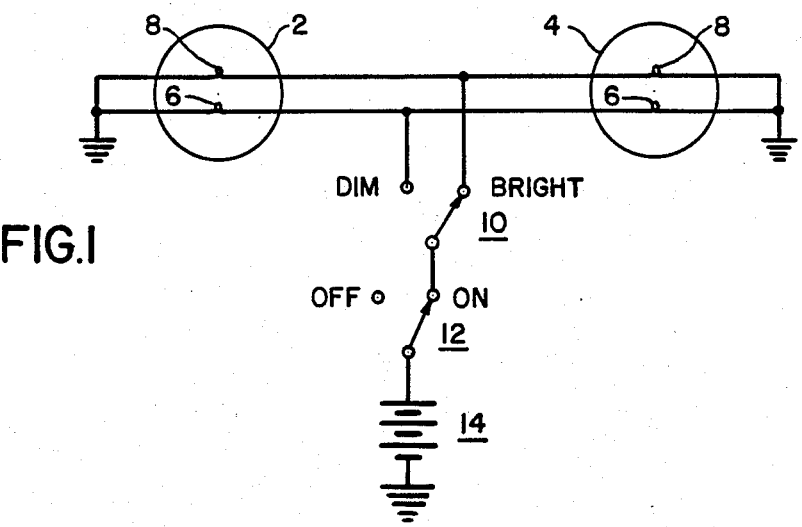
FIG. 1 is a functional diagram showing a common vehicle lighting system employing a single, dual-beam headlight on each side of the vehicle.

In FIG. 1 is shown diagrammatically a common lighting system for a vehicle having two headlights 2,4 which are mounted on the front of the vehicle, one on each side and both aimed to illuminate an area in front of the vehicle. Each headlight 2,4 contains two filaments, one filament 6 of which is configured within the headlight to cause illumination of an area relatively near the vehicle when "dim" lighting is desired, and the other filament 8 of which is configured within the headlight to cause illumination of an area relatively distant from the vehicle when "bright" lighting is desired. The actual location of the filaments within the headlights is well-known and is determined by the geometry of the reflector and lens and other factors.

Illumination of the headlights is controlled by switches 10,12 which are arranged to selectively direct current to the headlights from a source 14, shown as the vehicle's battery. The "off-on" switch 12 is generally part of a multiple-position, pull-type switch mounted on the vehicle dashboard, which switch may also be adaptable to operate other lights, such as "parking" lights, instrument lights and lighting within the vehicle. The "dim-bright" switch 10 is generally controlled by a hand lever on the steering column or is adapted to be operated by foot. In FIG. 1, the switches are shown in positions which cause "bright" lighting due to energization of filaments 8. "Dim" lighting is selected by moving switch 10 to its other position, causing energization of filaments 6. As shown in FIG. 1, the lighting system is incapable of adapting to defective operation of the headlights: if any filament is inoperative, there results the dangerous situation where only a single headlight will be illuminated.

Figure 2:
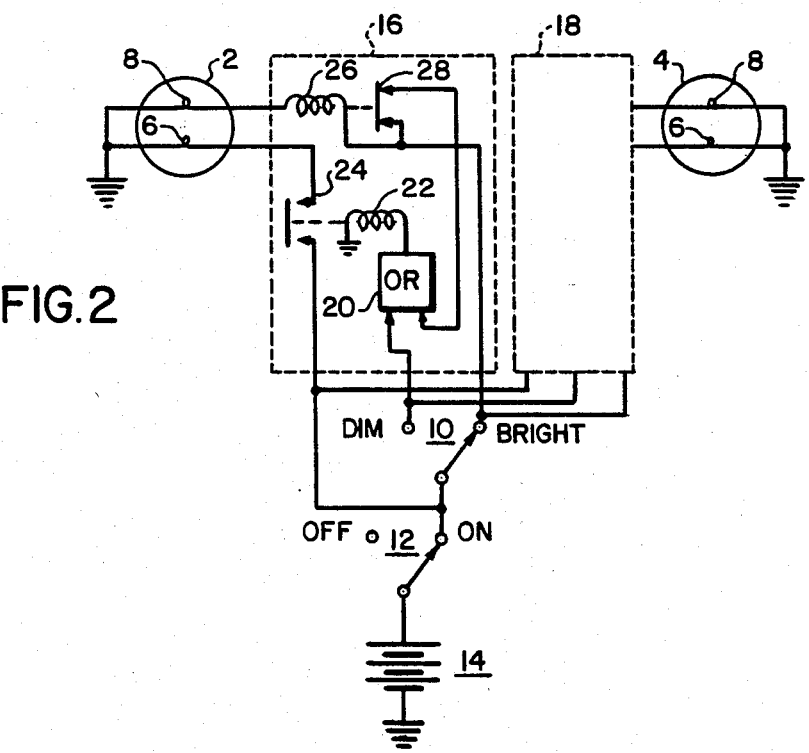
FIG. 2 is a functional diagram showing the preferred embodiment of the invention as applied to vehicle lighting systems employing single, dual-beam headlights on each side of the vehicle.

The lighting system shown in FIG. 1 can be modified, in accordance with the invention as shown in FIG. 2, to avoid this dangerous situation in the event that a "bright" filament 8 is defective. In addition to the elements shown in FIG. 1, control circuits 16,18 are located between the switches 10, 12 and the headlights 2,4. Since the control circuits are identical, only control circuit 16 is shown in detail.

When "dim" lighting is selected, current from the source 14 flows through switches 12 and 10 and an "OR" circuit 20 to operate a relay coil 22, closing its normally open contacts 24. Current then flows from the source through switch 12 and contacts 24 to energize "dim" filament 6.

When "bright" lighting is selected, current from the source 14 flows through switches 12 and 10 and a relay coil 26 to energize "bright" filament 8. Current through relay coil 26 causes its normally closed contacts 28 to open. In the event that "bright" filament 8 is not energized due to a defective filament or defective connections, there is no current through coil 26 and contacts 28 are therefore closed. Current from switch 10 then flows through contacts 28 and "OR" circuit 20 to energize coil 22, closing contacts 24 and energizing "dim" filament 6. Relay coil 26 has low resistance to insure that there is almost no reduction in the desired flow to filament 8. An additional safety feature involves the failsafe design based on the use of normally-closed contacts 28, insuring that the inventive design operates even if the relay coil is defective.

Thus, the embodiment of the invention that is shown in FIG. 2 provides the important safety feature of sensing any failure of a bright filament and causing the corresponding dim filament to be energized instead. Obviously, a similar control circuit could be connected to sense failure of a "dim" filament to cause a corresponding "bright" filament to be energized.

Although the invention is shown in FIG. 2 for use with the usual dual-filament headlights, it will be understood that the invention is equally applicable to vehicle lighting in which "bright" filament 8 and "dim" filament 6 are enclosed in separate headlights. Also, the "OR" circuit 20, coil 22 and contacts 24 can be replaced by a dual coil relay where each input to the "OR" circuit is applied to one of the dual coils and the contacts 24 are closed when either coil is actuated.

In another version of vehicle lighting, four headlights are employed, two on each side of the front of the vehicle, with the outer headlights containing two filaments and the inner headlights containing a single filament. One such configuration is shown in FIG. 3, where dim lighting is achieved by operating "dim" filaments 106 in outer headlights 102, 104, and where bright lighting is achieved by operating "bright" filaments 108 in outer headlights 102, 104 and simultaneously operating sole filaments 105 in inner headlights 107, 109. Of the two filaments on each side of the vehicle that are energized for bright lighting, one causes light to be directed at a greater distance from the vehicle than the other. In the system shown in FIG. 3, it is assumed that filaments 108 cause light to be directed at a greater distance than the light from filaments 105. The operation of the lighting system shown in FIG. 3 is otherwise similar to the operation of the system shown in FIG. 1, where the switches 110 and 112 correspond to switches 10 and 12, respectively and source 114 corresponds to source 14.

While it would obviously be possible to use the circuit shown in FIG. 2 to sense failure of both lights when bright lighting is selected, such double failure is unlikely and probably does not warrant usage. However, it would be advantageous to be able to substitute one of the bright filaments for a defective dim filament. Since bright filaments 105 direct light relatively close to the vehicle, these filaments could be used without the disadvantage of glare.

In FIG. 4 is shown a lighting system of the type shown in FIG. 3, but modified by the addition of control circuits 116, 118 between switches 110, 112 and headlights 102, 104, 107, 109. Control circuits 116, 118 are identical in operation so only control circuit 116 is shown in detail. The operation of control circuit 116 is similar to that described with respect to control circuit 16 in FIG. 2. However, in the embodiment of FIG. 4, operation of the dim filament 106 is sensed and its failure to operate causes filament 105 to be energized.

In FIG. 4, when switch 110 is positioned at "bright", current flows directly to filaments 108. Current also flows through "OR" circuit 120 to operate relay coil 122, causing its normally open contacts 124 to close such that current flows through the contacts to energize filament 105.

When switch 110 is positioned at "dim", current flows to dim filament 106 through relay coil 126. In the event that filament 106 is energized, the current through relay coil 126 causes normally closed contacts 128 to open. If filament 106 is not energized, due to the filament or its connections being defective, the absence of current through relay coil 126 causes contacts 128 to be closed; consequently, current flows through "OR" circuit 120 to relay coil 122, causing normally-open contacts 124 to close, thereby permitting current flow to filament 105.

The embodiments shown in FIGS. 2 and 4 utilize relays, but it will be apparent that solid state controls could be substituted for the relays. Also, more sophisticated existing lighting systems may in themselves contain circuits that are more complex than shown in FIGS. 1 and 3, in which case the invention may be embodied by altering the existing circuits to perform the inventive function without necessarily adding all of the circuits shown in FIGS. 2 and 4. It may also be desirable to provide indications of filament failure to the operator of a vehicle, in which case, indicator lamps or audible alarms could be activated by the current through contacts 28 (FIG. 2) or through contacts 128 (FIG. 4).

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

I claim:

1. A lighting system for a surface-movable vehicle of the type employing a first light-producing operator-selectable means to provide bright illumination and a second light-producing, operator-selectable means to provide dim illumination, where said bright illumination produces lighting of the surface further from the vehicle that said dim illumination, characterized by means responsive to the flow of electric current through said first light-producing means for sensing the operability of said first light-producing means to provide an indication of inoperability, and means comprising an OR circuit responsive to said indication of inoperability and to an indication that said second light-producing means has been operator-selected to cause said second light-producing means to operate in either case.

2. The system defined in claim 1, wherein both of said light-producing means are contained in a single vehicle headlight.

3. The system defined in claim 1, wherein the means for sensing the operability of said first light-producing means includes a relay whose operating coil is in series with said first light-producing means and which produces said indication of inoperability in the absence of electric current through the operating coil.

4. The system defined in claim 3, wherein the second light-producing means is controlled by another relay whose operating coil is connected to the output of said OR circuit.

5. A lighting system for a surface-movable vehicle of the type employing a first light-producing operator-selectable means to provide dim illumination and a second light-producing, operator-selectable means to provide bright illumination, where said bright illumination produces lighting of the surface further from the vehicle than said dim illumination, characterized by means responsive to the flow of electric current through said first light-producing means for sensing the operability of said first light-producing means to provide an indication of inoperability and means comprising an OR circuit responsive to said indication of inoperability and to an indication that said second light-producing means has been operator-selected to cause said second light-producing means to operate in either case.

6. The system defined in claim 5, wherein both of said light-producing means are contained in a single vehicle headlight.

7. The system defined in claim 5, wherein the means for sensing the operability of said first light-producing means includes a relay whose operating coil is in series with said first light-producing means and which produces said indication of inoperability in the absence of electric current through the operating coil.

8. The system defined in claim 7, wherein the second light-producing means is controlled by another relay whose operating coil is connected to the output of said OR circuit.

9. A lighting system for a surface-movable vehicle of the type employing a first light-producing, operator-selectable means to provide dim illumination and a second light-producing, operator-selectable means to provide bright illumination, where the second light-producing means comprises two portions with the first portion producing a first range of lighting relatively close to the vehicle and the second portion producing a second range of lighting relatively distant from the vehicle, characterized by:

means of sensing the operability of said first light-producing means to provide an indication of inoperability;

and means responsive to said indication of inoperablility to cause only said first portion of said second light-producing means to operate when said first light-producing means is operator-selected, and to cause both portions of said second light-producing means to operate only when the second light-producing means is operator-selected.

10. The system defined in claim 9, wherein a first vehicle headlight contains both the first light-producing means and the second portion of the second light-producing means, and a second vehicle headlight contains the first portion of the second light-producing means.

11. The system defined in claim 10, wherein the means for sensing the operability of said first light-producing means includes a relay whose operating coil is in series with said first light-producing means and which produces said indication of inoperability in the absence of electric current through the operating coil; and wherein the first portion of the second light-producing means is controlled by another relay whose operating coil is connected to the output of an OR circuit which is responsive to said indication of inoperability and to an indication that the second light-producing means has been operator-selected and which causes, in either case, the operation of the first portion of the second light-producing means.

* * * * *